Nov. 26, 1968 H. C. NATHANSON ET AL 3,413,573

MICROELECTRONIC FREQUENCY SELECTIVE APPARATUS WITH VIBRATORY MEMBER AND MEANS RESPONSIVE THERETO

Filed June 18, 1965 4 Sheets-Sheet 1

INVENTORS
Harvey C. Nathanson
& Robert A. Wickstrom
BY Gordon H. Telfer
ATTORNEY 3,413,573

MICROELECTRONIC FREQUENCY SELECTIVE APPARATUS WITH VIBRATORY MEMBER AND MEANS RESPONSIVE THERETO

Harvey C. Nathanson and Robert A. Wickstrom, Pittsburgh, Pa., assignors to Westinghouse Electric Corporation, Pittsburgh, Pa., a corporation of Pennsylvania
Filed June 18, 1965, Ser. No. 465,090
21 Claims. (Cl. 332—31)

ABSTRACT OF THE DISCLOSURE

A vibratory member, such as a cantilever, is used to control a field responsive element, such as a surface potential controlled transistor, to provide a "resonant gate transistor." An input signal at a resonant frequency of the vibratory member affects the output of the responsive element in a frequency selective manner. Utilization of resonant gate transistors to provide functions such as those of an oscillator, modulator, filter and frequency standard are described.

This invention relates generally to electronic apparatus that has frequency selective properties and, more particularly, to microelectronic devices and integrated circuits that include a tuning element.

Microelectronic tuned amplifiers, including those embodied in semiconductor integrated circuits, thin film integrated circuits and hybrid integrated circuits, heretofore required the use of a separate LC tank circuit or piezoelectric resonator that undesirably adds to the size and cost and reduces the reliability that could otherwise be obtained.

Several different approaches for fabricating a completely integrated tuned amplifier have been previously proposed including thin film inductors formed on or within the integrated circuit, active feedback networks provided by the use of phase shifters, for example, parallel T or distributed RC circuits or delay lines in the feedback path of the amplifier, or through the use of various negative resistance devices that present an inductive impedance such as a unijunction transistor. None of these or other various proposals prior to this invention have been completely satisfactory even when the problem is limited to that of providing a simple, high Q, fixed frequency bandpass response, mainly due to a tendency toward instability.

There has been proposed a solution to the tuning problem by directly joining a piezoelectric resonator and a device such as a semiconductor integrated circuit with acoustic isolation therebetween. While this solution is attractive for ultimate use, it requires the utilization of fabrication techniques not presently existing in semi-conductor integrated circuit technology and hence does not provide an immediately economical solution. For further information on devices comprising a piezoelectric resonator solidly mounted to a substrate reference should be made to copending application Ser. No. 415,913, filed Dec. 4, 1964 by W. E. Newell and assigned to the assignee of the present invention.

It is, therefore, an object of the present invention to provide apparatus for achieving stable, linear tuning in semiconductor integrated circuits and the like that may be employed without radical departure from existing semiconductor integrated circuit fabrication technology.

Another object is to provide improved frequency selective apparatus particularly on a microelectronic scale.

Another object is to provide an improved method of fabricating a tuning element in a semiconductor integrated circuit.

Another object is to provide improved frequency selective electronic apparatus for operation as tuned amplifiers, oscillators, filters, modulators and the like.

The invention, briefly, achieves the above-mentioned and additional objects and advantages through the provision of frequency selective apparatus including a vibratory member having a first portion securely mounted on a substrate and a second portion free to move over the substrate with some means on the substrate producing a variable electric response as determined by the position of the vibratory member. Preferably, the means on the substrate producing a variable electrical response is a surface potential controlled transistor. Means are also included, such as by a contact disposed under the vibratory member on the substrate, for establishing a varying electric field to cause the member to vibrate at the frequency of the varying electric field. Where that frequency is a resonant frequency for the vibratory member substantial motion will be produced that will affect in a frequency selective manner the output of the surface potential controlled transistor. At other than a resonant frequency, the varying electric field produces negligible movement in the vibratory member. Thus, the surface potential controlled transistor is operable as a tuned amplifier whose gate is the vibratory member and hence it may be called a resonant gate transistor.

Other aspects of this invention involve the utilization of a resonant gate transistor as described in various combinations of elements to provide functions such as those of an oscillator, modulator, filter and frequency standard.

Another aspect of the invention pertains to the method of fabrication of the resonant gate transistor by techniques thoroughly compatible with those employed in semiconductor integrated circuit fabrication.

The present invention, together with the above-mentioned and additional objects and advantages thereof will be better understood by reference to the following description, taken with the accompanying drawing, wherein:

FIGS. 8 through 14 are schematic views of the present invention embodied in various combinations of elements to perform various frequency selective functions.

Figures 1, 2, 3, 4:
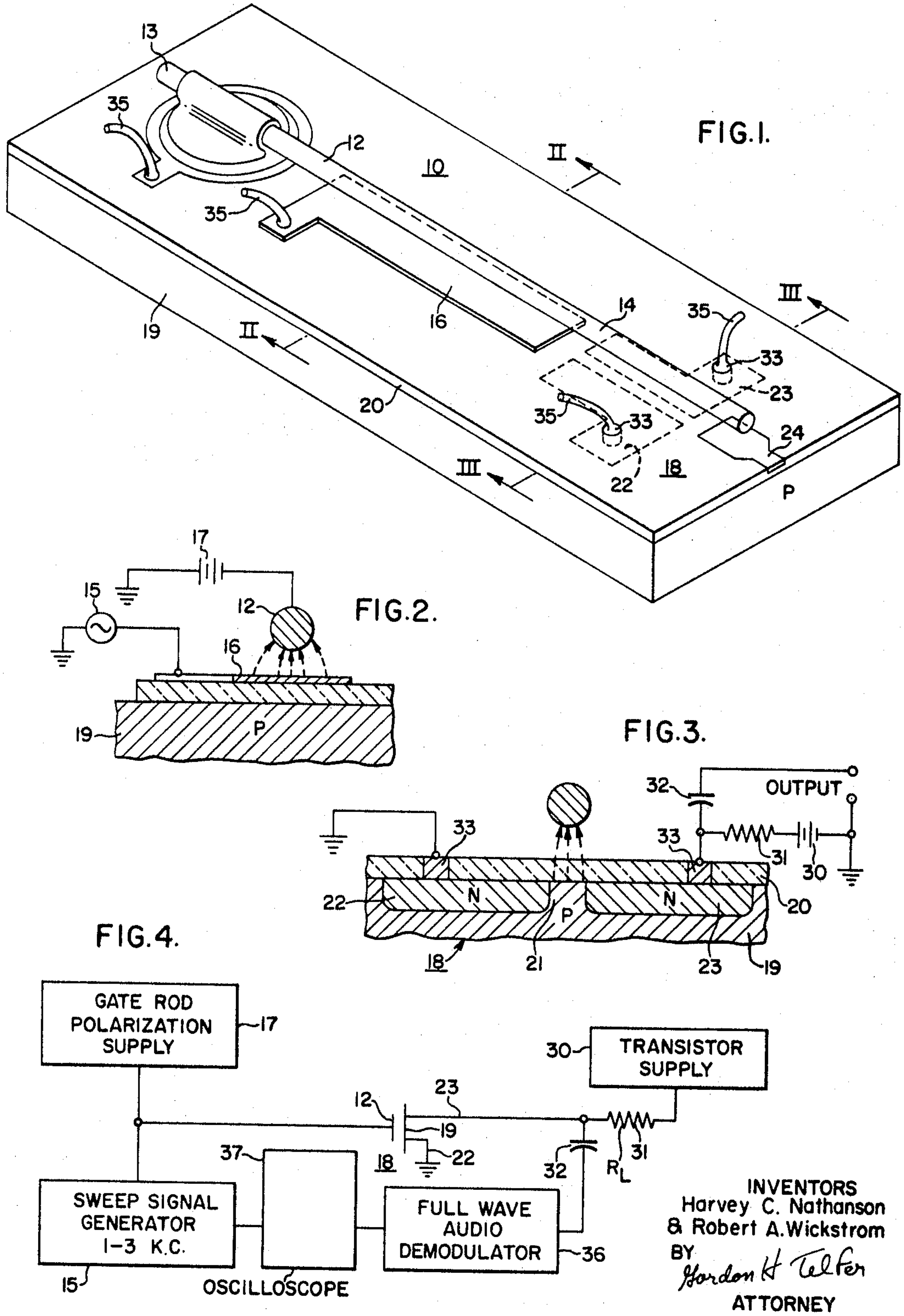
FIG. 1 is a perspective view of one embodiment of the present invention.
FIGS. 2 and 3 are sectional views taken, respectively, along lines II—II and III—III of FIG. 1 with additional circuit elements shown schematically.
FIG. 4 is a schematic diagram of a circuit used to test an example of the invention.

Referring to FIGS. 1, 2 and 3, an exemplary form of the present invention is illustrated that comprises a substrate 10, a vibratory member 12 including a first portion 13 affixed to the substrate and a second portion 14 free to move over the substrate. At least the second portion 14 of the vibratory member 12 comprises electrically conductive material. A means for establishing a variable electric field including a contact 16 on the substrate 10 to which an AC signal may be applied by source 15 (FIG. 2) causes the vibratory member to vibrate at the frequency of the applied signal. The vibratory member 12 preferably is polarized by a DC source 17. The polarity of source 17 may be positive or negative. The variation affects a means on the substrate that produces a variable electrical response determined by the position of the vibratory member. For this purpose a surface potential controlled transistor 18 is disposed on the substrate under the second portion 14 of the vibratory member 12. Some means for electrical isolation through the substrate between the vibratory member 12 and the responsive means is provided. The surface potential controlled transistor 18 may be any whose characteristics are affected by a potential or field at the surface thereof. The discussion herein will be primarily directed to devices where the transistor is a field effect transistor with an insulating layer over its channel.

The substrate 10 in this example comprises a body 19 of semiconductive material such as silicon on which there is disposed a layer 20 of insulating material such as silicon dioxide that besides serving the usual purposes of stabilizing the semiconductor surface also serves as the above-mentioned means for electrical isolation. The vibratory member 12 and contact 16 are insulated from the semiconductive material 19 by the oxide layer 20 that is relatively thick (e.g. about 2,000 to 10,000 angstroms). Thus the illustrated structure may be part of a semiconductor integrated circuit that includes in other portions additional resonant gate transistors or other functional elements in accordance with known semiconductor integrated circuit technology. In the case in which the substrate is of silicon it is, of course, preferred to form the responsive element 18, the surface potential controlled transistor, within the silicon.

In this example, the transistor 18 comprises a pair of semiconductive regions 22 and 23 of semiconductivity type opposite to that of the immediately adjacent material. The bulk material of semiconductive substrate 19 is of p-type semiconductivity, the regions 22 and 23 are of n-type and may provide respectively source and drain regions of a known type of device. An ohmic contact 33 is affixed to each of the regions 22 and 23. The conductance of the channel 21, that portion of the substrate between the source and drain regions, may be modulated by variations in the field at the surface overlying the channel region. Since the rod 12 is polarized negatively in this example, the transistor operates in a depletion mode. It could, alternatively, be polarized positively for accumulation mode operation.

In conventional surface potential controlled transistors of the field effect type the channel conductance modulation is achieved by signals applied to a contact or electrode disposed directly on the oxide. There is no need for such a contact or electrode in the practice of the present invention. That is because the polarization and signal potentials on the vibratory member 12 create in themselves an electric field that influences the channel. FIGS. 2 and 3 show a few lines of force of the electric fields between rod 12 and plate 16 and between rod 12 and the channel 21 of transistor 18, respectively, for the illustrated example. The vibration of member 12 causes variation in the field strength in the channel. The transistor 18 is supplied by a source of potential 30 through a load 31. The output may, for example, be taken from across the load 31, through a capacitor 32 for DC isolation, and applied to a subsequent amplifier stage or used directly by a utilization device. For making the necessary electrical connections, individual leads 35 are affixed to the vibratory member 12, the contact 16, and the ohmic contacts 33. Often the output of the transistor 18 will be applied to a bipolar transistor in the same integrated circuit for more gain.

In this example, the vibratory member 12 is a cantilever, that is, a member of appreciable rigidity affixed at only one end to the substrate. Such members have particular resonant frequencies of vibration to which they can be excited, where comprised of conductive material, by electrostatic means. This is achieved, in this example, by the contact 16, that may sometimes be referred to as a force plate, that underlies most of the length of the cantilever 12 to which a signal may be applied at a resonant frequency of the member 12. The force plate 16 may be omitted with the signal applied directly to the beam 12 although that is not preferred. When the signal is applied directly to the beam 12, it is fed through to the transistor regardless of frequency with, however, a peak amplitude at resonance. Using the force plate 16 for applying the signal, with the beam 12 at A.C. ground, insures that only the resonant frequency is exhibited by the transistor output.

Several alternatives to the form of the invention shown in FIGS. 1, 2 and 3 are to be noted although such alternatives are mentioned merely by way of further example and are not intended to exhaust the possible arrangements of the invention.

The substrate, of course, need not be a body of semiconductive material. Among the other possibilities are for it to be a body of an insulator such as a ceramic employed as a substrate in a thin film integrated circuit in which case the responsive element could be a thin film transistor of known type disposed on the ceramic member or a separately fabricated surface potential controlled transistor mounted thereon but without electrostatic shielding.

The vibratory member 12 need not be a cantilever. It may, for example, be a plate, a diaphragm or rod mounted at two ends.

The responsive means itself need not be as shown since any of a variety of known surface potential controlled electronic elements may be employed. For example, the responsive means may be a junction bipolar transistor having the vibratory member positioned over, for example, the emitter-base junction.

An additional contact 24 is shown on the oxide layer 20 under the extreme extremity of the beam 12. This is merely to illustrate another degree of flexibility with devices in accordance with the present invention. In addition to providing a gate element for the surface potential controlled transistor, the vibratory member 12 may act as a relay if designed to respond to vibration with such amplitude that it will contact the element 24 and act as a switch closing a circuit.

As an example, a low frequency, about 2,000 cycles per second, high Q resonant gate transistor was made substantially as shown in FIG. 1 with, however, the signal applied directly to rod 12. The starting material was of p-type silicon on which by conventional oxide masking and diffusion techniques source and drain regions 22 and 23 were formed by diffusion to produce a surface controlled transistor of the inversion layer type with a channel length, that is, the spacing between the source and drain regions, of 6.0 microns.

After the diffusion operations, during which the surface of the source and drain regions was reoxidized, contact windows were opened where desired for the source and drain contacts and an aluminum layer of about 2,000 angstroms thickness was evaporated over the entire surface followed by an evaporated silver layer of a thickness of about 2,000 angstroms. The purpose of the aluminum was to make good ohmic contact to the diffused regions. The purpose of the silver was to permit the secure mounting of a cantilever on the device.

Following the metal evaporation steps, the silver-aluminum layer was selectively etched away leaving contacts on the source and drain regions and a mounting pad on the oxide surface where the cantilever was to be mounted. The mounting pad had a diameter of about 20 mils. Next, a layer of a masking material having a thickness selected to be that desired for the spacing of the cantilever from the device surface in the undeflected position was formed followed by a second layer of masking material that had an opening in the position of the cantilever. The first layer used for spacing the rod was of a photoresist material sold under the trade name KMER photoresist in a thickness of about ½ mil and the second layer was of the same material having a thickness of about ¼ mil. These layers serve to hold the rod parallel to the oxide surface and in the right alignment during soldering of the cantilever. The cantilever was an annealed tungsten wire with circular cross-section having one mil diameter plated with about 2 microns of gold to facilitate soldering. It was cut to a length of 120 mils and placed in the alignment slot. A 20 mil diameter by 1 mil thick indium-lead-tin solder pellet, having a melting point of about 160° C., was placed between the silver pad and the wire end. The structure was fired at 185° C. for about 20 seconds to weld the rod end to the silver pad. The layers of masking material were then removed and the device tested.

The testing of the device was performed as follows and as shown in FIG. 4. Like reference numerals for elements corresponding to those of FIGS. 1 to 3 are used. A load resistor 31, $R_L$, was connected to the drain of the transistor. $R_L$ was selected to be of a value to match the channel resistance of the transistor, 220 ohms. A polarization voltage was provided by the gate rod polarization supply 17 to the cantilever 12. The polarization voltage was of +55 volts. (Note this is of opposite polarity to that illustrated in FIG. 2, this merely reverses the electric field.) A sweep signal generator 15 was connected to the rod 12 providing a signal of 0.8 volt AC over a range of frequencies from 1 to 3 kilocycles. The transistor supply 30 was +10 volts. The output of the transistor 18 was applied to an oscilloscope 37 through a full wave audio demodulator 36 and found to exhibit a resonant peak at 2.04 kilocycles.

The calculated resonant frequency of the beam in the fundamental mode was determined and found to be 2.08 kilocycles. Hence, the experimental results were in good agreement of the calculated value. The resonant characteristic was measured to have a bandwidth of about 12 cycles per second indicating a Q of about 170. No signal was seen in the output except at the resonant frequency.

Thus it has been demonstrated that by means of the present invention tuned circuits may be formed compatible in size with conventional integrated circuits. It is clear that tuning down to frequencies of about a few hundred cycles may be achieved without exceeding tolerable dimensions.

The selection of the material of which the resonant member is made permits high Q such as up to 1,000 or more with certain low internal loss material such as phosphor-bronze and nickel.

Since the only frequency selective member of the device is the resonant member, drift due only to thermal expansion of that member, about 10 parts per million per degree centigrade is expected under optimum bias conditions.

It is expected that linear operation at frequencies within the range of from about 100 cycles, per second to $10^6$ cycles per second is possible using devices in accordance with this invention. It is to be noted that it is possible to operate at higher order modes of resonance than the fundamental mode provided the geometry of force plate 16 is chosen properly relative to cantilever 12. For example, the transverse resonant frequencies of a rod of circular cross-section clamped at one end are given by:

$$f_R=(m)0.27985\sqrt{\frac{E}{\rho}}\cdot\frac{r}{L^2}\ \text{sec}^{-1}$$

where $r$=rod radius in meters $L$=rod length in meters $m$=the mode number for a particular mode such as:

| Mode: | $m$ |
|---|---|
| 1 | 1.000 |
| 2 | 6.267 |
| 3 | 17.548 |
| 4 | 34.387 |

$E$=Young's modulus of the rod in newton-meters$^{-2}$ $\rho$=density of the rod in kilogram-meters$^{-3}$ Thus, in the example above, a signal applied at a frequency of about 12.79 kc. (6.27 times 2.04 kc.) could cause the rod to vibrate at that frequency in its second mode of vibration.

In general, the permissible modes of resonance are limited by the position of the force plate 16 and responsive device 18 relative to the vibratory member 12. Or, stated differently, a particularly mode giving a particular resonant frequency can be achieved by proper geometry selection. The proper condition is to design the structure so that neither the force plate nor the responsive device is located at a naturally occurring node of the vibrating member.

Figure 5:
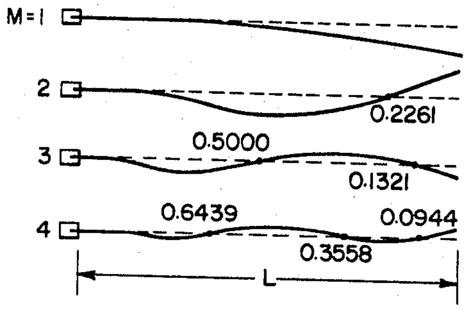
FIGS. 5 and 6 are charts to further illustrate aspects of the present invention.

FIG. 5 illustrates the shape of a circular rod in various modes ($m$) of vibration and the positions at which nodes occur in the second, third and fourth modes. In the second mode, for example, the single node occurs at 0.2261 L from the free end. The force plate 16 and responsive device 18 can be placed on either side of this position for effective operation. The third and higher modes offer a wider choice. Since there are two nodes in the third mode, there are three positions available to dispose the force plate 16 and responsive device 18 thus permitting, if desired, two responsive devices (in or out of phase) or, alternatively, two force plates. The positions of nodes with other resonant member configurations can be similarly calculated.

Figure 6:
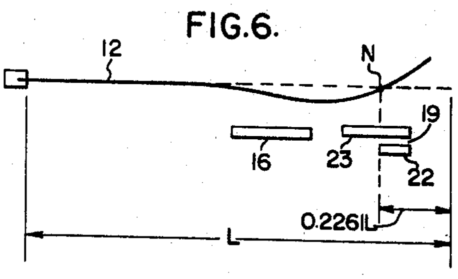

It will be noted that the vibratory member 12 will respond to a signal appearing on the drain contact as well as on force plate 16. Hence an inherent feedback occurs that may be negligible where the output signal is low relative to the input. However, it is possible to avoid such feedback (as would be desirable in a device exhibiting voltage gain). FIG. 6 illustrates a modification utilizing the nodal position of the beam 12 in second (or higher) mode of vibration. The drain 23 is centered at the node N so that its net electrostatic force effect on the rod 12 is zero. The force plate 16 is spaced from the node as is the transistor channel 19 as it is essentially confined to the area directly between the source 22 and drain 23 when their spacing is small relative to the length of the drain 23.

Devices in accordance with this invention may exhibit voltage gain if the transistor is operated in a pinch-off condition. Surface potential controlled transistor structures can be readily made whose pinch-off voltage is as low as about 1–2 v. Devices in accordance with this invention have been made exhibiting 6 db of voltage gain.

In the tuned system described, the input AC signal sees essentially only the capacitative impedance of the electrode to which it is applied. Thus a high input impedance is achieved. At low and intermediate frequencies, the vibrating member is totally isolated from the transistor load, leading to a Q which is not degraded by the impedance level of the external load and bias circuitry.

The preferred method of fabricating cantilevers on a substrate in accordance with this invention generally comprises the steps of forming on a substrate a first mask having an opening where the mounting of the cantilever is to be made. The first mask, conveniently of a commercially available photoresist material, does not have an opening that extends along the position the free portion of the beam is to take. In that position, the first mask has a thickness equal to that desired for the spacing of the beam from the substrate surface. Thereafter a second mask is formed, either with or without fabricating some part of the beam itself prior thereto. The second mask, also preferably of a photoresist material, has an opening in the position of the cantilever mounting and along the position to be taken by the free portion of the beam. A cantilever is formed by deposition of metal in the mentioned openings and the masks are removed, as by conventional stripping solvents.

The description in connection with the making of a device as in FIG. 1 includes one example of this method. However, in order to avoid handling separate rods and fastening them to a substrate, it is preferred to form the vibratory member from metal deposited by evaporation or plating or both as in the immediately following description.

Figure 7A:
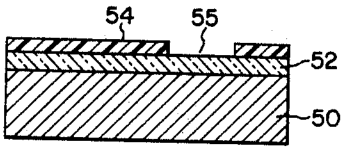
FIGS. 7A through 7G are partial sectional views illustrating, at successive stages, the fabrication of a vibratory member on a semiconductor substrate.

In FIGS. 7A through 7G there is shown a method of producing a cantilever for use in the present invention by thin film techniques that are compatible with those employed in integrated circuit fabrication. FIG. 7A shows a silicon substrate 50 with a layer 52 of insulating material such as silicon dioxide thereon to which there has been applied a layer of a masking material 54 having an opening 55 at the position desired to fix the beam to the substrate. The masking material 54 is conveniently one of the commercially available negative photoresist materials. That is, the photoresist is one that becomes insoluble where exposed so that the opening formed on developing it has a slightly gradually increasing diameter toward the top of the layer. Vertical evaporation of a continuous metal film is thus possible. The thickness of mask 54 is selected in accordance with the desired spacing of the ultimate beam from the surface of the oxide layer 52.

Figure 7B:
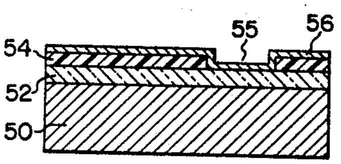

FIG. 7B shows the structure after there has been formed over the entire upper surface a continuous metal layer 56 that adheres well within the opening 55 to the oxide layer 50 and furthermore has a surface amenable to the ready disposition of additional material thereon. The metal layer may be formed, for example, by first evaporating a layer of chromium to a thickness of about 750 angstroms and then a layer of gold to a thickness of about 1500 angstroms.

Figure 7C:
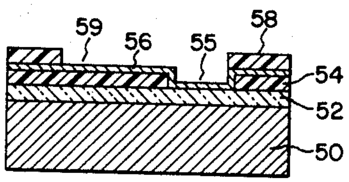

FIG. 7C shows the structure after a second layer of masking material 58 has been formed on top of the metal layer. This masking material is in a pattern such that there is an opening 59 where the beam is to be affixed to the oxide and also in the position where the beam is to extend over the oxide. This layer 58 may also be formed of a commercially available photoresist material.

Figure 7D:
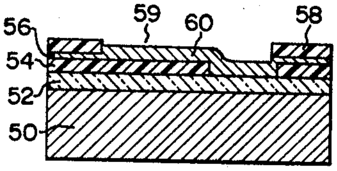

FIG. 7D shows a structure after additional metal 60 has been deposited within opening 59 to the desired thickness of the ultimate beam. This may be performed by the plating of a metal such as gold using standard gold plating techniques.

Figure 7E:
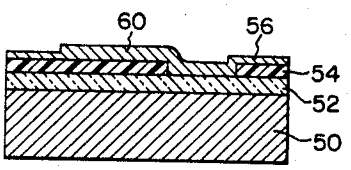

FIG. 7E illustrates the structure after the second layer of masking material 58 has been removed by using a known type of solvent.

Figure 7F:
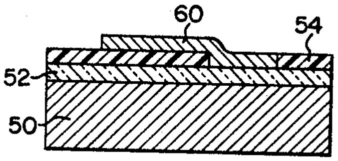

FIG. 7F shows the structure after the unprotected first layer of metal 56 has been removed as by etching. The etching operation is not continued substantially beyond the removal of the first metal layer so that it does not appreciably effect the thickness of the plated metal 60.

Figure 7G:
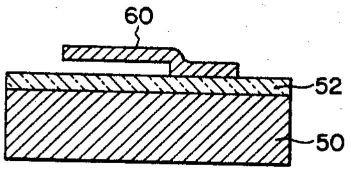

FIG. 7G shows the ultimate structure after the first photoresist layer 54 has been removed by an appropriate solvent. Cantilever 60 is affixed at one end to the oxide layer 52 with its other end free to vibrate.

Following is a detailed specific example in keeping with FIGS 7A to 7G. This process may be performed after all the diffusion operations and electrical contacts have been formed on a semiconductor integrated circuit by conventional techniques. The oxidized slice is "degreased" to prepare the oxide to accept the chrominum layer by submerging it in boiling trichloroethylene for ten minutes, followed by a five minute double-distilled methyl alcohol boil and heat lamp dry.

The thick photoresist spacer layer 54 with appropriate holes 55 is formed by placing the slice on a resist spinner and covering it with a coating of fresh undiluted KMER photoresist (available from Eastman Kodak Co.) using an eyedropper. The slice is then spun first at a low speed (~1000 r.p.m.) for 15 seconds, an intermediate speed for 10 seconds and a high speed (~3500 r.p.m.) for 5 seconds. The initial low speed essentially determines the ultimate thickness of the layer, while the last 5 second high-speed spin removes the outside photoresist tip that usually forms when spinning undiluted KMER photoresist at low speed. After spinning, the slice is baked out at 90° C. in air for 30 minutes. This process forms a resist layer of about 5 microns thickness. If additional thickness is required, a bake-out of 15, rather than 30 minutes is employed, and the above process is repeated, resulting in a layer 10 microns thick. Final bake-out is 30 minutes at 90° C. in air.

The photoresist layer is exposed through a suitable optical mask under a xenon lamp for 30 seconds, and spray developed. The photoresist windows are then inspected under 400× dark field illumination to make sure all KMER photoresist has been removed from the windows so as to permit good chromium adhesion to the oxide. A final 15 minute, 150° C. postbake is then employed.

The slice is placed in a conventional high vacuum system. A 750 angstrom chrome layer followed by a 1500 angstrom gold layer is evaporated, without opening the system in-between the deposition of layers. The metals are evaporated slowly, using a quartz-microbalance to measure film thickness. Conventional tungsten evaporation boats are employed. After evaporation, layers are inspected for cracking, and other defects.

A positive-working photoresist, available under the trademark POSITOP from Shipley Co. Inc., Wellesley, Mass. is sprayed onto the surface of the slice over the chrome-gold to a thickness of about 2 microns. The slice is immediately transferred on a glass slide in a horizontal position to a prebake furnace where it is heated at 90° C. in air for 30 minutes. The positive photoresist is exposed through an appropriate optical mask using a 10 sec. xenon lamp followed by a 10 min. mercury lamp exposure. The resist image is then dipped, then spray developed and rinsed. After a 400× dark field inspection, the resist layer is postbaked for 15 min. at 150° C. in air.

A contact is affixed to the thin gold layer 56 and the slice submerged in a gold plating solution of about pH 7. A 12 micron layer of gold is electrolytically plated up in the regions of the slice not covered by the mask 58. The final gold deposit is examined for smoothness, graniness, etc. under 400× magnification.

After plating, the mask 58 is stripped in a spray of acetone. The thin gold layer 56 is removed in a 50% solution of aqua regia at 25° C. The thin chrome layer is removed using a saturated solution of potassium ferricyanide made basic to a pH of 8–10 in NaOH and heated to 60° C. The slice is then submerged in a solution of a commercial KMER photoresist stripper called J100 (Indust.-Ri-Chem, Richardson, Texas) held at 100° C.±5° C. for 15 minutes. This removes the underlying KMER photoresist layer and frees the beam. The slice is then rinsed first in boiling, then 25° C. deionized $H_2O$ and force air dried. The finished cantilevers are inspected for parallelness with the $SiO_2$ surface.

Devices constructed using this process have been tested. Center frequencies of about 3000 c.p.s. with Q's over 100 have been observed in a number of devices. In addition, multiple cantilever (7) structures have been fabricated using this method.

Cantilevers 38 mils long by 1 mil wide and ½ mil thick with a uniform ½ mil spacing from the silicon dioxide surface have been made by this process with excellent results. The technique described is also useful for producing conductive bridges between two portions of an integrated circuit or the like, such as "crossovers."

Many applications of resonant gate transistors, other than merely as an amplifier tuned to a single frequency, are feasible. The nature and variety of these applications will be better understood by the following description in connection with FIGS. 8 to 14. Where conveniently possible, the same reference numerals are used as for the corresponding elements of FIGS. 1 to 3.

Figure 8:
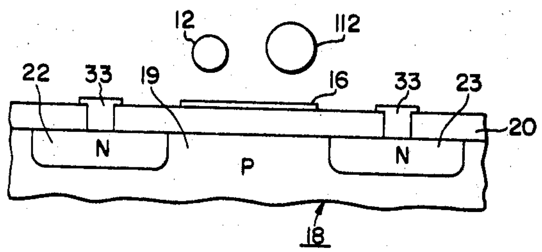

FIG. 8 illustrates a surface potential controlled transistor 18 comprising source and gate regions 22 and 23 wherein two vibratory members 12 and 112 are positioned over the channel 19. If the two members have different dimensions and hence different resonant frequencies and a signal is applied to the force plate 16 an AC signal will be fed through to the drain of the transistor if the applied signal is of a frequency like that of a resonant frequency of either of the resonant members. Naturally more than two resonant members of suitable dimensions may be so disposed. Also, of course, a unitary structure may comprise a plurality of resonant gate transistors.

Figure 9:
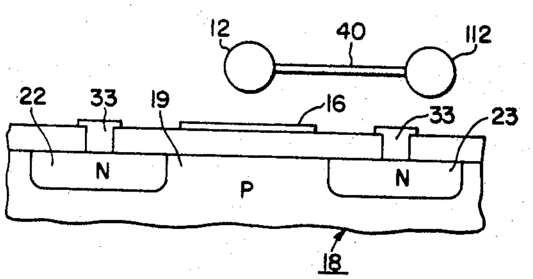

FIG. 9 illustrates a configuration similar to that of FIG. 6 but where the two resonant members 12 and 112 have substantially the same vibration characteristics and resonant frequencies and are weakly mechanically coupled by a member 40. Only member 12 is directly over the force plate 16. Upon excitation of member 12 the mechanical coupling between the members will cause member 112 to vibrate. However, the frequency of vibration will be not quite identical and hence the effect is to provide a filter with a notch characteristic, that is, having a bandpass over a range of frequencies. In general, the width of the notch will depend on the number of resonant members that are weakly coupled.

Figure 10:
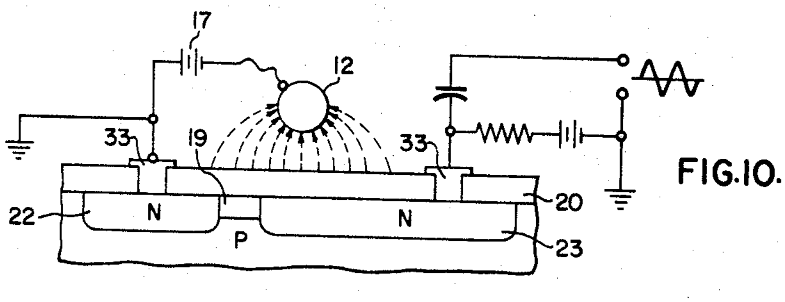

FIG. 10 illustrates a configuration where the resonant member is positioned closer to the drain 23 of the surface potential controlled transistor than to the source 22. Polarization voltage is applied to the resonant member of opposite polarity to that of the drain supply of the transistor. Without applying any AC signal, the applied DC voltages cause an electrostatic attraction between the vibrating member and the drain causing the beam to move toward the drain which, in turn, causes the channel conductance of the device to decrease. As the beam comes closer to the drain the potential of the drain goes more positive tending to accentuate the movement. Under proper conditions, this initiates vibration of the resonant member with resulting variation in the voltage of the transistor drain producing an oscillatory output.

Figure 11:
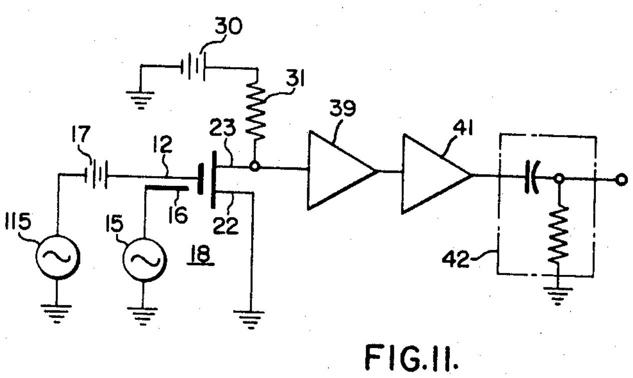

FIG. 11 illustrates a modulator circuit employing the present invention wherein a signal at a first frequency from a source 115 is applied to the resonant member 12 of a resonant gate transistor 18 that may be as shown in FIG. 1. The signal is not at a resonant frequency of the rod. A carrier wave is applied to the force plate 16 from a source 15 at a resonant frequency resulting in amplitude modulation of the carrier waveform by the signal. The output from drain 23 is amplified by amplifier stages 39 and 41 and filtered by high pass filter 42. Successful experiments have been performed with a signal at 80 c.p.s., a carrier frequency at 2000 c.p.s. and a high pass RC filter on the output of 100,000 ohms and 200 pf.

Figures 12A, 12B, 13, 14:
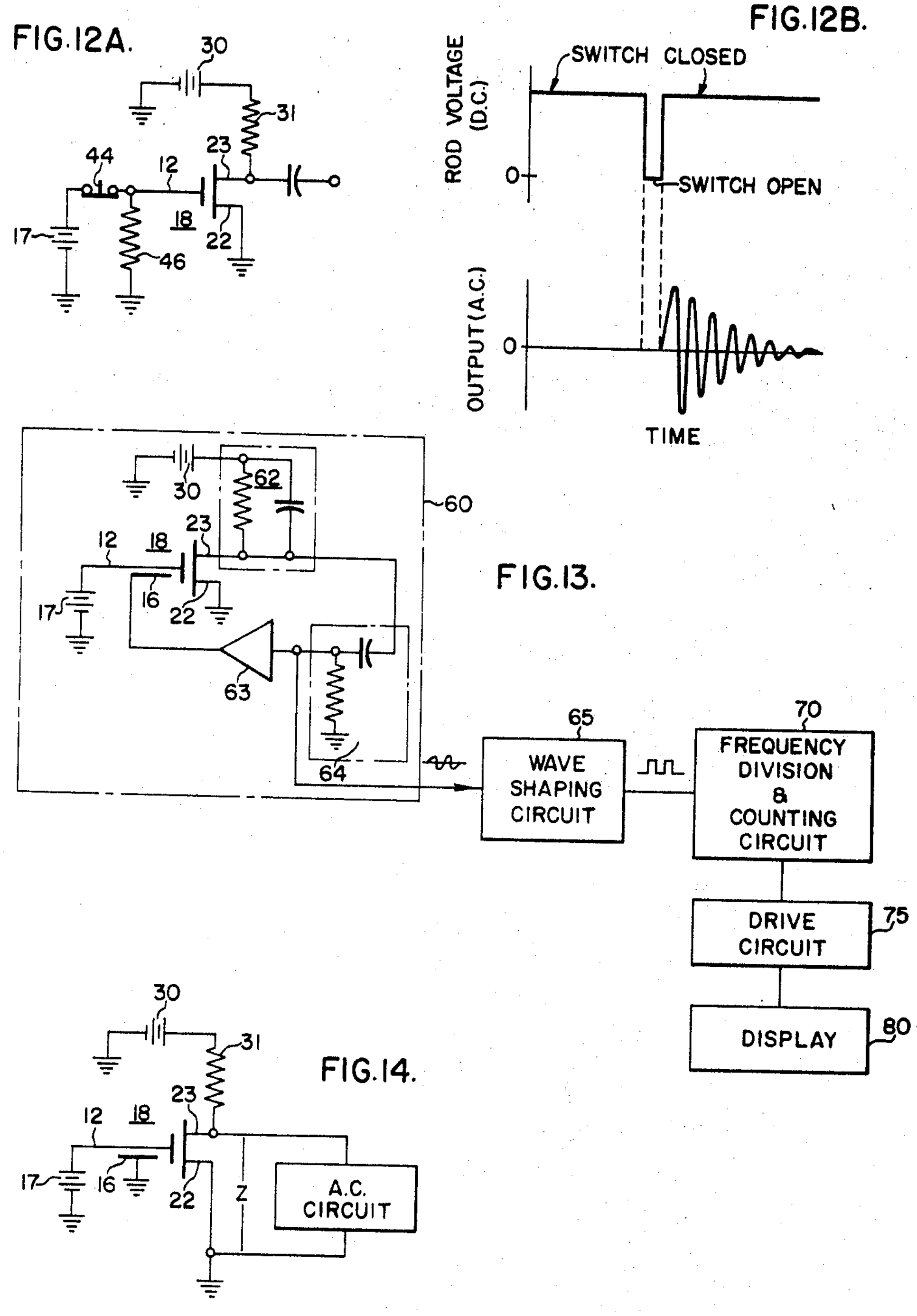

FIG. 12A illustrates a pulse oscillator utilizing the present invention wherein means are provided to momentarily open the circuit to the resonant member in a manner producing an AC pulse of diminishing amplitude in the output. DC voltage source 17 is enough to cause the cantilever to be partially deflected to an equilibrium position. If some means 44 is provided, such as a pushbutton digit selector on a telephone, to interrupt the rod voltage for a time less than the period of the pulse produced, the voltage drops to zero instantly on opening the switch because of resistor 46. The rod will spring back to its level position and vibrate mechanically at its resonant frequency. This resonance is not shown in the output because there is no voltage on member 12. When the circuit is again closed the vibratory member is still vibrating and now an output is seen until the rod returns to equilibrium, a period dependent upon the Q of the cantilever and may be of the order of $\frac{1}{10}$ second.

FIG. 12B illustrates the described operation. If a plurality of such pulse oscillators are provided having different frequencies, a multiple-frequency signal device results. For example, seven such devices could be employed to provide pulses in a push button telephone. Frequencies now used of 697, 770, 851, 941, 1209, 1336 and 1477 c.p.s. can all be achieved by resonant gate transistors.

FIG. 13 illustrates a resonant gate transistor 18 used in a standard frequency oscillator 60 of a time standard. Because of the small size of this device it is feasible to use it an an electronic wrist watch, for example.

The oscillator generates a signal of fixed frequency using in-phase feedback from the drain 23 to the force plate 16. The drain supply 30 is connected to the drain through a reactive load 62. The feedback network includes a decoupling network 64 and an amplifier, such as a bipolar transistor 63, for gain. The output is then supplied to successive circuits 65, 70 and 75 to achieve, respectively, an appropriate wave shape, a fixed number of pulses per second, i.e., some division of the original signal, and a driving circuit for activating a display 80 that may be clockhands, a digital display or apparatus producing audio tones. The apparatuses 65, 70, 75 and 80 may be of conventional forms.

While an oscillator utilizing external feedback (from transistor to force plate) has been illustrated in FIG. 13 for providing a frequency standard in a watch or the like, it is to be noted that an oscillator employing internal feedback such as that illustrated in FIG. 10 may also be used for such purposes.

FIG. 14 illustrates a resonant gate transistor utilized as a variable reactance. A fixed D.C. potential is applied between the vibratory member 12 and force plate 16. Load 31 and D.C. supply 30 may, or may not, be used to establish a D.C. quiescent point. In either event, the impedance Z presented by this combination to an A.C. circuit is constant at all frequencies away from resonance (approximately equal to the A.C. channel impedance). At a resonant frequency, the interaction between member 12 and drain 23 changes this impedance, resulting in a frequency dependent reactance suitable for utilization in tuning functions.

While the present invention has been shown and described in a few forms only it will be understood that various changes and modifications may be made without departing from the spirit and scope thereof.

What is claimed is:

1. Frequency selective apparatus comprising: a substrate; a vibratory member having a first portion affixed to said substrate and a second portion free to move over said substrate, at least said second portion comprising electrically conductive material; electric field means for establishing a varying electric field to cause said member to vibrate at the frequency of said varying electric field; responsive means on said substrate producing a variable electrical response determined by the position of said member.

2. Frequency selective apparatus as defined in claim 1 wherein: said member has a characteristic resonant frequency of vibration; said electric field means establishes an electric field that varies in direction at the resonant frequency of vibration of said member to cause said member to vibrate at said resonant frequency.

3. Frequency selective apparatus as defined in claim 1 wherein: said substrate comprises a body of semiconductive material; said responsive means is a surface potential controlled transistor comprising regions within said body; said second portion of said member is disposed over said transistor.

4. Frequency selective apparatus as defined in claim 1 wherein: said substrate comprises a body of insulating material; said responsive means is a surface potential controlled transistor disposed on the surface of said body; said second portion of said member is disposed over said transistor.

5. Frequency selective apparatus as defined in claim 1 wherein: said vibratory member is a cantilever of metal.

6. Frequency selective apparatus as defined in claim 1 wherein: said means for establishing a varying electric field comprises at least one electrical contact on said substrate; an AC source coupled to said contact; and a DC source coupled to said member.

7. Frequency selective apparatus as defined in claim 1 wherein: said electric field means comprises both an AC source and a DC source coupled to said member.

8. A semiconductor device comprising: a body of semiconductive material, said body including a semi-conductive region providing a channel region and a source contact and a drain contact disposed at opposite extremities of said channel region; a cantilever having a first portion mounted on said body and a second portion that is free to move over said channel region; an electrical contact disposed on said body under said cantilever and spaced from said channel to permit, upon the application of AC signals thereto, the excitation of said cantilever to vibration in a mode of transverse resonance.

9. A semiconductor device in accordance with claim 8 wherein: said body comprises a region of a first type of semiconductivity having first and second spaced regions of a second type of semiconductivity therein with said source and drain contacts on said first and second spaced regions respectively; a layer of insulating material covering and regions except for said source and drain contacts; said cantilever being mounted on said body by conductive material disposed on said layer of insulating material; said electrical contact also being disposed on said layer of insulating material.

10. A semiconductor device in accordance with claim 9 further comprising: an additional electrical contact disposed on said layer of insulating material at a position so that said cantilever makes contact therewith when excited to resonance.

11. Frequency selective apparatus comprising: a substrate; a plurality of vibratory members each having a first portion mounted on said substrate and a second portion free to move over said substrate, at least the second portion of each said vibratory members comprising electrically conductive material, said plurality of members having substantially identical individual resonant frequencies of vibration; means to couple mechanically said plurality of members; means for establishing a varying electric field to cause at least one of said members to vibrate and, by said means to couple mechanically, to cause the others of said plurality of members to vibrate; responsive means on said substrate producing a variable electrical response determined by the position of said members whereby the apparatus exhibits a bandpass characteristic over a range of frequencies.

12. Frequency selective apparatus in accordance with claim 11 wherein: said responsive means on said substrate is a surface potential controlled transistor.

13. Frequency selective apparatus comprising: a substrate; a vibratory member having a first portion affixed to said substrate and a second portion free to move over said substrate; means on said substrate producing a variable electrical response determined by the position of said member including a surface potential controlled transistor having source and drain contacts, said second portion of said member being positioned nearer to one of said source and drain contacts than the other; means to apply solely a direct current voltage to said member of a first polarity; means to apply solely a direct current voltage to said one of said source and drain contacts to which said member is nearer of a second polarity to produce an electric field drawing said member to said substrate and initiating mechanical vibration producing an oscillatory output signal from said transistor at the frequency of such vibration.

14. Frequency selective apparatus in accordance with claim 3 further comprising: at least a second vibratory member having a first portion mounted on said substrate and a second portion free to move over said transistor; said first and second members being substantially mechanically independent and having different resonant frequencies of vibration; said electric field means also causing said second member to vibrate when the electric field varies at a resonant frequency of said second member.

15. A frequency selective device comprising: a surface potential controlled transistor; a vibratory member mechanically joined to said transistor with electrical isolation means therebetween; means to excite said vibratory member to resonant vibration producing an output signal at the resonant frequency from the transistor.

16. A tuned modulator comprising a frequency selective device as defined in claim 19 further comprising: means to apply an input signal to said vibratory member at other than a resonant frequency so said output signal is amplitude modulated in accordance with said input signal.

17. A tuned modulator in accordance with claim 16 wherein: said means to excite includes a source of carrier signals applied to a contact in electrostatically cooperative relation with said vibratory member.

18. A pulse oscillator comprising a frequency selective device in accordance with claim 15 wherein said means to excite includes means to apply a D.C. pulse to said member.

19. A frequency selective device comprising: a surface potential controlled transistor; a vibratory member mechanically joined to said transistor with electrical isolation therebetween; a contact disposed in a position to affect electrostatically and move said member.

20. A standard frequency oscillator comprising a frequency selective device in accordance with claim 19 wherein an in-phase feedback network is coupled between the output of said transistor to said contact.

21. A frequency variable impedance comprising a frequency selective device in accordance with claim 19 wherein a fixed D.C. potential is applied between said vibratory member and said contact.

References Cited

UNITED STATES PATENTS

| | | | |
|---|---|---|---|
| 2,618,690 | 11/1952 | Stuetzer | 307—88.5 |
| 3,136,867 | 6/1964 | Brettell | 179—111 |
| 2,898,477 | 8/1959 | Hoesterey | 307—88.5 |

ALFRED L. BRODY, *Primary Examiner.*